(12) United States Patent
Kobayashi et al.

(10) Patent No.: US 6,936,359 B2
(45) Date of Patent: Aug. 30, 2005

(54) APPARATUS FOR WARMING-UP FUEL CELL

(75) Inventors: Tomoki Kobayashi, Saitama (JP);
Takuma Kanazawa, Saitama (JP);
Yoshio Nuiya, Saitama (JP); Hiroshi Shimanuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 245 days.

(21) Appl. No.: 09/870,957

(22) Filed: May 30, 2001

(65) Prior Publication Data

US 2001/0053469 A1 Dec. 20, 2001

(30) Foreign Application Priority Data

May 30, 2000 (JP) ........................................ 2000-160098
Mar. 2, 2001 (JP) ........................................ 2001-058785

(51) Int. Cl.[7] .............................................. H01M 8/04
(52) U.S. Cl. ............................. 429/13; 429/22; 429/24; 429/26
(58) Field of Search .............................. 429/13, 17, 22, 429/23, 24, 25, 26

(56) References Cited

U.S. PATENT DOCUMENTS

| | | | | |
|---|---|---|---|---|
| 5,208,114 A | * | 5/1993 | Uematsu et al. | 429/20 |
| 5,441,819 A | | 8/1995 | Voss et al. | 429/13 |
| 5,518,828 A | * | 5/1996 | Senetar | 429/26 |
| 5,543,238 A | * | 8/1996 | Strasser | 429/17 |
| 5,928,805 A | * | 7/1999 | Singh et al. | 429/13 |
| 6,106,964 A | | 8/2000 | Voss et al. | 429/20 |
| 6,268,074 B1 | * | 7/2001 | Siepierski et al. | 429/13 |
| 6,306,532 B1 | * | 10/2001 | Kurita et al. | 429/20 |
| 6,394,207 B1 | * | 5/2002 | Skala | 180/65.2 |
| 6,447,939 B1 | * | 9/2002 | Iwasaki | 429/9 |
| 6,497,971 B1 | | 12/2002 | Reiser et al. | 429/13 |

FOREIGN PATENT DOCUMENTS

| | | | |
|---|---|---|---|
| JP | 58-164157 | * | 9/1983 |
| JP | 62-219472 | * | 9/1987 |
| JP | 2000-195533 | * | 7/2000 |

* cited by examiner

Primary Examiner—Jonathan Crepeau
(74) Attorney, Agent, or Firm—Lahive & Cockfield, LLP; Anthony A. Laurentano, Esq.

(57) ABSTRACT

An apparatus for warming-up a fuel cell has means for returning an exhaust gas which returns the exhaust gas to the supply gas depending upon the warning-up conditions of the fuel cell at the time when the supply gas is supplied into the fuel cell and it is discharged as the exhaust gas after utilizing the supply gas in the fuel cell.

17 Claims, 10 Drawing Sheets

APPARATUS FOR WARMING-UP FUEL CELL

BACKGROUND OF THE INVENTION

1. Field of the Invention

The present invention relates to an apparatus for warming-up a fuel cell, which generates electric power utilizing oxygen contained in the air.

2. Description of Related Arts

A fuel cell (solid macromolecular type fuel cell) has recently drawn considerable attention as a power source of an electric vehicle etc., because of its cleanness and excellent energy efficiency. For example, Japanese Patent Laid-Open No. 7-240220 discloses a fuel cell system which circulates hydrogen and oxygen supplied into the fuel cell to be reused. The oxygen in this fuel cell system is supplied from an oxidant gas-supplying apparatus. The oxygen remaining unused in the fuel cell is returned to the oxygen-supplying line to be reused. The same can be applied to the hydrogen. The hydrogen remaining unused in the fuel cell is returned to the hydrogen-supplying line to be reused. Because highly pure oxygen and hydrogen are supplied from the oxidant gas-supplying apparatus and the hydrogen gas-supplying apparatus, respectively, the oxygen and hydrogen can be circulated to be reused.

On the other hand, a fuel cell system has been known in which the air is taken from the atmosphere, and the oxygen in the air is used in the fuel cell. In such a configuration, if the oxygen is circulated to be reused, the concentration of the oxygen is decreased (the nitrogen concentration is increased), lowering the efficiency of the fuel cell. Accordingly, the exhaust air discharged from the fuel cell is discharged to the atmosphere without circulation.

The fuel cell can generate electric power in an efficient manner at a temperature higher than the atmospheric temperature (from 80–90° C. in the case of the macromolecular type), and cannot generate electric power if the fuel cell is well warmed. Consequently, it is required to rapidly heat (warm-up) the fuel cell to a prescribed temperature at the time of stating the fuel cell. Particularly, when the fuel cell is carried on an electric vehicle, it should be warmed-up more rapidly. Accordingly, in such a type of the fuel cell system that the air is taken from the atmosphere, a heat exchanger is provided to carry out heat exchange between the exhaust air and the supply air.

However, the supply air is heated by imparting the heat from of the exhaust air to the supply air in the heat exchanger. For this reason, there is a problem that the warming-up the fuel cell cannot be carried out in a rapid manner at starting the fuel cell in which the temperature of the exhaust air is low. This problem becomes serious under low temperature conditions such as cold districts and wintertime, because the temperature of the exhaust gas discharged from the fuel cell is much more lower.

Also, in some cases, the temperature of the exhaust gas discharged from the fuel cell is lowered depending upon the operating conditions. In such cases, the temperature of the supply gas supplied into the fuel cell should be higher than a given temperature. However, in some cases, the supply air cannot be sufficiently heated only through the heat exchanger.

SUMMARY OF THE INVENTION

An object of the present invention is, therefore, to provide an apparatus for heating a fuel cell which can rapidly warm-up the fuel cell at starting the fuel cell and which can also sufficiently heat the supply air even if the temperature of the exhaust gas is decreased depending upon the operating conditions of the fuel cell.

According to the first aspect of the present invention which attains the object described above, there is provided an apparatus for warming-up a fuel cell having means for returning an exhaust gas which returns the exhaust gas to the supply gas depending upon the warming-up conditions of the fuel cell at the time when the supply gas is supplied into the fuel cell and it is discharged as the exhaust gas after utilizing the supply gas in the fuel cell.

The means for returning the exhaust gas is, for example, a tree-way valve in the embodiments described later on, which switches the position from an exhaust position where the exhaust gas (exhaust air) from the fuel cell is discharged per se to a returning position where the exhaust gas is returned to the supply gas (supply air) or vice versa. When being switched to the returning position, a circulation cycle of the exhaust gas is formed. The term "depending upon the warming-up conditions of the fuel cell" to be used herein means "depending upon the temperature situations of the fuel cell, etc."

According to this configuration, since the heat possessed by the exhaust gas, for example, the heat generated from the fuel cell, can be returned, the fuel cell can be rapidly warmed-up immediately after starting the fuel cell, and the moisture remaining in the interior of the fuel cell can also be effectively utilized.

In the apparatus for warming-up a fuel cell according to the present invention, the means for returning the exhaust gas is preferably controlled depending upon the temperature of the exhaust gas.

For example, if the temperature of exhaust gas is low, the means for returning the exhaust gas is switched to the exhaust position as the warming-up of the fuel cell has been completed or for the purpose of protecting the fuel cell.

Since the conditions of the fuel cell (temperature, humidity, etc.) have great influence upon the temperature of the exhaust gas, it is most advantageous for controlling the means for returning the exhaust gas to utilize the temperature of the exhaust gas as a reference for the decision.

In the apparatus for warming-up a fuel cell according to the present invention, the apparatus may have a compressor which discharges the exhaust gas from the fuel cell and which returns the exhaust gas to the supply gas.

According to this configuration, since the heat generated by the adiabatic compression of the compressor can be used in warming-up of the fuel cell, rapid warming-up of the fuel cell can be securely carried out regardless of the situations of electric generation of the fuel cell. While pressure loss occurs in the fuel cell, etc., the compression through the compressor in order to recover the pressure loss generates heat.

In the apparatus for warming-up a fuel cell according to the present invention, the apparatus may have a pressure controller which controls the pressure of the exhaust gas from the fuel cell.

According to this configuration, the range of increasing the temperature of the exhaust gas can be set by controlling the pressure of the compressor. For example, when the pressure downstream the compressor (discharge pressure) is increased by means of the pressure controller, the temperature of the exhaust gas is increased. Conversely, if it is decreased, the increasing the temperature of the exhaust gas is lowered. The exhaust gas whose range of increasing the temperature is set is returned to the supply gas. If the pressure controller is composed of a pressure control valve, such as a butterfly valve, the pressure downstream the compressor is increased when the opening of the pressure control valve is decreased. Conversely, the pressure downstream the compressor is decreased if the opening is increased. As the pressure controller, preference is given to use one in which the exhaust gas flows without changing enthalpy (or little change in enthalpy).

In the apparatus for warming-up a fuel cell according to the present invention having a pressure controller, the pressure controller is preferably controlled depending upon the temperature of the supply air.

For example, if the temperature of the supply air becomes high, the pressure downstream the compressor is decreased by means of the pressure controller. On the other hand, if the temperature of the supply air becomes low, the pressure downstream the compressor is increased. According to this configuration, the supply gas to be supplied into the fuel cell can be set to be an appropriate temperature.

In the apparatus for warming-up a fuel cell according to the present invention just mentioned, the pressure controller is controlled by comparing the temperature of the supply gas with a target temperature of the supply gas.

According to this configuration, the supply air having an appropriate temperature can be supplied into the fuel cell. The target temperature can be appropriately set depending upon the type of the fuel cell and how to carry out warming-up.

In the apparatus for warming-up a fuel cell according to the present invention, the supply gas is air which is supplied to an oxygen pole side of the fuel cell, and the means for returning the exhaust gas is controlled depending upon the amount of oxygen in the air supplied into the oxygen pole of the fuel cell.

According to this configuration, when the air to be supplied into the oxygen pole of the fuel cell is heated to warm-up the fuel cell, the amount of the exhaust gas returned is controlled depending upon the amount of oxygen in the air supplied into the oxygen pole of the fuel cell. Accordingly, the shortage of the oxygen in the fuel cell during the course of warming-up the fuel cell can be prevented. While a hydrogen pole side of the fuel cell is warmed-up from the oxygen pole side, the hydrogen pole side is warmed-up via a membrane of the fuel cell.

In the apparatus for warming-up a fuel cell according to the present invention just mentioned, when the amount of oxygen is decreased due to the power generation of the fuel cell, the amount of the exhaust gas to be returned is decreased by the means for returning the exhaust gas.

According to this configuration, the amount of oxygen to be supplied is decreased due to the power generation of the fuel cell, the amount of the exhaust gas returned is decreased. Since the amount of the exhaust gas having a low oxygen content is decreased and the amount of the supply gas having a large oxygen content is increased in the air to be supplied into the fuel cell, a sufficient amount of oxygen can be supplied into the fuel cell.

Also, according to the second aspect of the present invention, there is provided an apparatus for heating a fuel cell having a compressor, which supply a supply gas into the fuel cell and which discharge the supply gas as an exhaust gas after being utilized in the power generation in the fuel cell, characterized in that the gas is heated by heat generated by the adiabatic compression of the compressor, the heated gas is supplied into the fuel cell to warm-up the fuel cell, and the gas discharged from the fuel cell is returned to the compressor to form a circulation cycle.

According to this configuration, even at the time of stating the fuel cell, the heat contained in the gas discharged from the compressor can be supplied to the intake side of the compressor via the fuel cell in the case where the temperature of the supply gas to be supplied into the fuel cell is decreased. Consequently, the fuel cell can easily be heated to an appropriate temperature range.

In the apparatus for heating a fuel cell according to second aspect of the present invention, the circulation cycle preferably possesses a heat exchanger between the gas before heated by the compressor and the gas after heated by the compressor, and the gas heated by the heat exchanger is supplied to the fuel cell.

According to this configuration, since the heat itself forms a small circulation cycle at the time of supplying the heated supply gas is circulated and supplied into the compressor, the heat due to the adiabatic compression of the compressor can be transmitted to the fuel cell in an effective manner.

Since the concentration of the oxygen in the air is decreased at the time of power generation of the fuel cell, the power generation efficiency will change for the worse if all of the gas is continued to be returned. For this reason, the heat exchanger which can selectively recover the heat is provided to rapidly warm-up the fuel cell and to prevent the situation out of the fuel (lacking in oxygen).

In the apparatus for heating a fuel cell according to second aspect of the present invention, the apparatus judges whether or not the warming-up of the fuel cell has been completed, and the power generation is started after the warming-up is judge to be completed.

According to such a configuration, after the fuel cell is heated to a temperature range for obtaining good efficiency of the power generation of the fuel cell, the fuel cell can generate electric power.

In the apparatus for heating a fuel cell according to second aspect of the present invention having the configuration just mentioned, the judgment of the completion of the warming-up is preferably on the basis of the temperature of the exhaust gas discharged form the fuel cell.

According to this configuration, whether or not the warming-up of the fuel cell has been completed is judged on the basis of the exhaust gas discharged form the fuel cell. Accordingly, the warming-up of the fuel cell can be detected without separately providing any detector for detecting the completion of starting the fuel cell.

DESCRIPTION OF THE PREFERRED EMBODIMENTS

Embodiments of the apparatus for warming-up the fuel cell according to the present invention will now be described by referring to the attached drawings.

[First Embodiment]

The apparatus for warming-up the fuel cell according to the first embodiment will be described herein below.

Figure 1:
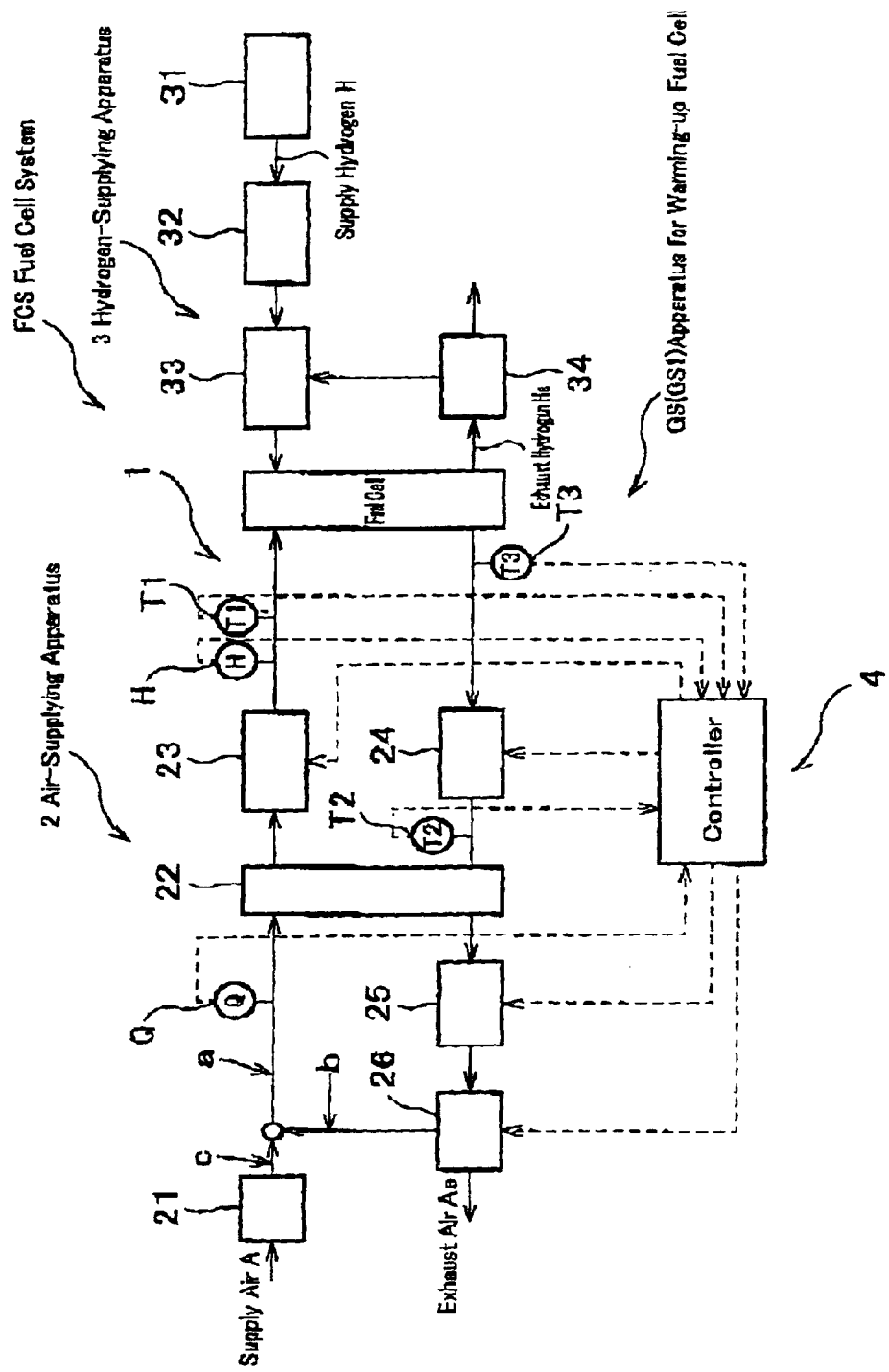
FIG. 1 totally shows a fuel cell system including an apparatus for warming-up a fuel cell according to the present invention.
Figure 2:
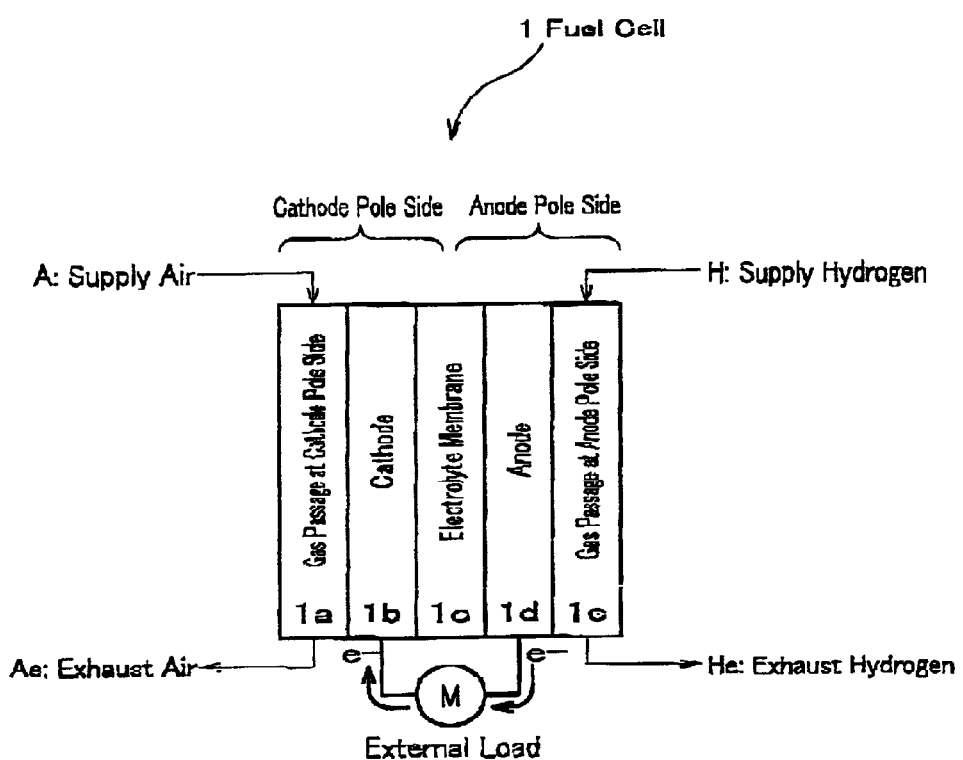
FIG. 2 is a schematic view illustrating the configuration of the fuel cell in FIG. 1.
Figure 3:
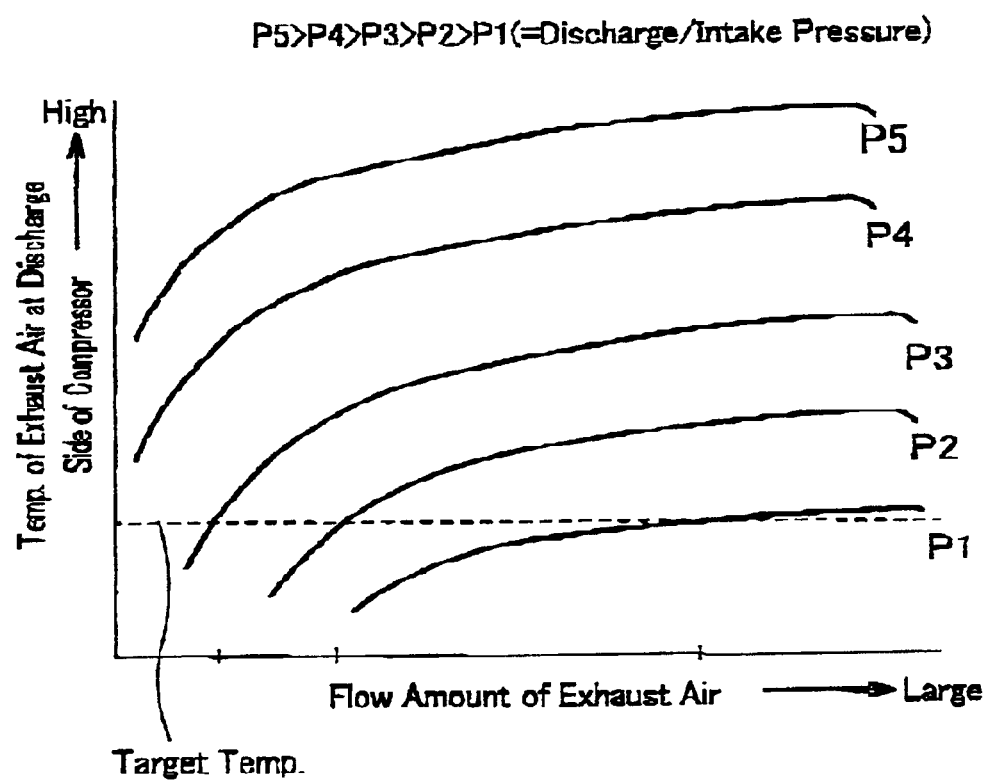
FIG. 3 is a graph showing the temperature-increasing profile in the compressor shown in FIG. 2.

In the following explanation which demonstrates the first embodiment, FIGS. 1 to 3 are used for the reference, wherein FIG. 1 totally shows a fuel cell system including an apparatus for warming-up a fuel cell according to the present invention; FIG. 2 is a schematic view illustrating the configuration of the fuel cell in FIG. 1; and FIG. 3 is a graph showing the temperature-increasing profile in the compressor shown in FIG. 2.

A fuel cell system FCS shown in FIG. 1 is an electric power generation system based on a fuel cell 1. The fuel cell system FCS is mainly composed of the fuel cell 1, an air-supplying apparatus 2, a hydrogen-supplying apparatus 3, a controller 4, and the like. The apparatus GS (GS1) for warming-up the fuel cell is composed of the air-supplying apparatus 2, and a controller 4. The fuel cell system FCS is carried on a vehicle (fuel cell electric vehicle).

As shown in FIG. 2, the fuel cell 1 is divided into a cathode side (an oxygen pole side) and an anode side (a hydrogen pole side) across an electrolyte membrane 1c. Electrodes containing a platinum series catalyst are provided on both sides to form a cathode electrode 1b and an anode electrode 1d, respectively. As the electrolyte membrane 1c, a solid macromolecular membrane such as a perfluorocarbon sulfonic acid membrane, which is a proton-exchange membrane, is used. The electrolyte membrane 1c has a plurality of proton exchanging groups in the molecule thereof, and a low specific resistance not more than 20 Ω-proton at the normal temperature when it has a saturated moisture content, acting as a proton-conductive electrolyte. The catalyst contained in the cathode 1b is a catalyst in order to produce oxygen ions from oxygen, and the catalyst contained in the anode 1d is a catalyst in order to produce protons from hydrogen.

A cathode side gas passage 1a which allows a supply gas A as an oxidant gas for passing therethrough is provided outside the cathode electrode 1b, while an anode side gas passage 1e which allows hydrogen H to be supplied as a fuel gas for passing therethrough is provided outside the anode electrode 1d. An inlet and outlet of the cathode side gas passage 1a are connected to the air-supplying apparatus 2, and an inlet and outlet of the anode side gas passage 1d are connected to the hydrogen-supplying apparatus 3. The configuration of the fuel cell 1 shown in FIG. 2 is schematically shown as a single cell, but an actual fuel cell 1 is made up of a laminate with approximately 200 single cells laminated.

Since the fuel cell heats up due to electrochemical reaction during the course of the power generation, the fuel cell 1 has a cooler (not shown) which cools the fuel cell 1.

In the fuel cell 1, when the supply air A is supplied to the cathode side gas passage 1a and the supply hydrogen H is supplied to the anode side gas passage 1e, hydrogen is ionized due to the catalyzation at the anode electrode 1d to produce protons, which then move within the electrolyte membrane 1c to reach the cathode electrode 1b. The protons reaching the cathode electrode 1b are readily reacted with the oxygen ions produced from the oxygen contained in the supply air A to produce water. The supply air A containing the water thus produced is discharged from the outlet at the cathode side of the fuel cell 1 as exhaust air Ae, which contains a large amount of moisture). Electron e⁻ are produced at the anode electrode 1d at the time of ionizing hydrogen, the resulting electrons e– reach the cathode electrode 1b via an external load M such as a motor.

As shown in FIG. 1, the air-supplying apparatus 2 making up the apparatus GS1 for warming-up the fuel cell is composed mainly of an air cleaner 21, a heat exchanger 22, a humidifier 23, a compressor 24, a pressure control sensor 25, a three-way valve 26, an airometer (flow sensor) Q, thermo-sensors $T_1$, $T_2$, and $T_3$, a humidity sensor H, and the like.

The air cleaner 21 is composed of a filer (not shown), and the like, and filtrates the air supplied to cathode electrode side of the fuel cell 1 (supply air A) the to thereby remove dusts contained in the supply air A.

The heat exchanger 22 (as an apparatus) is composed of a plate type heat exchanger or a shell and tube type heat exchanger possessing passages at a low temperature fluid side and a high temperature side (not shown), and performs heat exchange between the air compressed through the compressor 24 (exhaust air Ae) and the supply air A having been filtered through the air cleaner 21. The supply air A is heated through the heat exchanger 22 and then is introduced into the fuel cell 1. The fuel cell 1 is operated at a temperature from about 80 to 90° C. For this reason, the temperature-controlled supply air A controlled to be from 60 to 75° C. is introduced into the fuel cell 1. The temperature control of the supply air A will be described fully later on.

The humidifier 23, which is one of a carburetor, is composed of Venturi tubes (capillary tubes), a water-storage tank, a siphon which connects the Venturi tubes and the water-storage tank etc. (not shown), the water stored in the water-storage tank is pumped by the Venturi action and is sprayed to humidify the supply air A. Into the siphon tube is inserted a needle which is driven by a stepping motor to control the flow amount of the water flowing through the siphon tube (the needle and the siphon tube making up a needle valve). As described above, the humidification of the supply air A is to humidify the fuel cell 1 thereby preventing the drying of the electrolyte membrane 1c shown in FIG. 2. If the electrolyte membrane 1c is dried, the migration of the protons is inhibited, lowering the electromotive force. On the other hand, if the fuel cell 1 is humidified in excess, the cathode side gas passage 1a shown in FIG. 1 and/or diffusion layers (not shown) are soaked in water, leading to decrease in the electromotive power. The humidifier 23 may be comprised of a water-permeable membrane.

The compressor 24 (means for pressing in the exhaust gas) is composed of a super charger (volume type compressor), a motor which drives the super charger (not shown), and the like, and the compressor 24 sucks the supply air A which has been used as the oxidant gas in the fuel cell 1, i.e., the exhaust air Ae discharged from the cathode pole side of the fuel cell 1, and deliveries it to the later heat exchanger 22. By sucking the supply air A, the compressor 24 plays role in operating the fuel cell 1 through a negative pressure (pressure not higher than the atmospheric pressure). The compressor also adiabatically compresses the exhaust air Ae to raise the temperature of the exhaust air, whereby the exhaust air Ae having been heated up is used as a heat source for heating the supply air A.

The pressure control valve (pressure controller) 25 is composed of a butterfly valve and a stepping motor (not shown), and the like, and it controls the pressure of the exhaust air Ae out of the compressor (discharge pressure) by decreasing or increasing the opening of the pressure control valve 25. When the opening of the pressure control valve 25 is decreased, the discharge pressure from the compressor 24 is increased and, accordingly, the range of increasing the temperature of the exhaust air Ae is increased. Conversely, when the opening of the pressure control valve 25 is increased, the discharge pressure from the compressor 24 is decreased, and accordingly, the range of increasing the temperature of the exhaust air Ae is decreased.

The pressure control vale 25 makes the exhaust air flowing in a situation where change in enthalpy is small. For this reason, the temperature decrease of the exhaust gas after flown through the pressure control valve 25 is small.

The tree-way valve 26 (means for returning the exhaust gas) is composed of a passage switcher driven through electromagnetic force (not shown) and it switches the passage of the exhaust gas Ae to an exhaust position or a returning position. When the three-way valve 26 is set at the exhaust position, the exhaust gas Ae is discharged out of the system. On the other hand, when the three-way valve 26 is set at the returning position, the exhaust gas Ae is returned to a line of the supply air A positioned between the air cleaner 21 and the heat exchanger 22 (to form a circulation cycle). The conditions for switching the position of the tree-way valve 26 to the exhaust position or the returning position will be described later on.

The airometer Q is composed of a differential pressure type flow meter etc., and it detects the flow amount of the supply air A after flowing through the, air cleaner 21 (after joining with the exhaust air Ae) and sends the detected signal to the controller 4.

The thermo-sensor $T_1$ is composed of a thermister etc., and it detects the temperature of the supply gas A at the inlet of the fuel cell 1 at the cathode side, which is sent to the controller 4.

The thermo-sensor $T_2$ is composed of a thermister etc., similar to the thermo-sensor $T_1$, and it detects the temperature of the exhaust air Ae at the outlet of the compressor 24, which is sent to the controller 4.

The thermo-sensor $T_3$ is composed of a thermister etc., similar to the thermo-sensor $T_1$ and $T_2$, and it detects the temperature of the exhaust air Ae at the outlet of the fuel cell 1 of the cathode pole side, which is sent to the controller 4.

The humidity sensor H is composed of a macromolecular type humidification sensor, etc., and it detects the humidity of the supply gas A at the inlet of the fuel cell 1 at the cathode side, which is sent to the controller 4.

As shown in FIG. 1, the hydrogen-supplying apparatus 3 is composed of a hydrogen gas cylinder 31, a regulator 32, a hydrogen-circulating pump, a three-way valve 34, and the like.

The hydrogen gas cylinder 31 is composed of a high-pressure hydrogen bottle (not shown) and it stores the supply hydrogen gas H to be introduced into the anode pole side of the fuel cell 1. The supply hydrogen H to be stored is pure hydrogen having a pressure of from 15 to 20 MpaG (150–200 kg/cm$^2$G). It is noted that the hydrogen gas cylinder 31 may be a type having a built-in hydrogen-occlusion alloy which stores hydrogen at a pressure of approximately 1 MpaG (10 kg/cm$^2$G).

The regulator 32 is composed of a diaphragm, a pressure-adjusting spring (not shown), etc. and is a pressure controller which decreases the pressure of the supply hydrogen stored at a high pressure to a prescribed level so that the supply hydrogen H may be utilized at a constant pressure. Taking the atmospheric pressure as the reference pressure to be introduced into the diaphragm, the regulator 32 can decrease the pressure of the supply hydrogen H stored in the hydrogen gas cylinder 31 to a level near the atmospheric pressure. Taking the pressure of the negative pressure portion of the air-supplying apparatus 2 which is operated at a negative pressure as a reference pressure to be introduced into the diaphragm, the pressure of the supply hydrogen H stored in the hydrogen gas cylinder 31 can be decreased to a pressure near the pressure of the corresponding negative pressure portion. In the first embodiment, since the hydrogen-supplying apparatus 3 is operated at a negative pressure not higher than the atmospheric pressure, the pressure at the intake side of the compressor 2 of the air-supplying apparatus 2 is input as the reference pressure. By operating the hydrogen-supplying apparatus 3 at a negative pressure, the external leakage of the flowing hydrogen can be prevented, which improve the fuel efficiency.

The hydrogen-circulating pump 33 is composed of an ejector (not shown), etc., and it utilize a flow of the supply hydrogen H towards the anode side of the fuel cell 1 to suck the supply hydrogen H having been used in the fuel cell 1, i.e., the exhaust hydrogen He, which is discharged from the anode side of the fuel cell 1 and flows through a three-way valve 34, and to circulate it. The reason why the exhaust hydrogen is circulated and used is that the supply hydrogen H is pure hydrogen stored in the hydrogen gas cylinder 31.

The three-way valve 34 is composed of a passage switcher (not shown), etc., and it switches the passage of the exhaust hydrogen He to the discharge position or circulation position. When the three-way valve 34 is switched to the discharge position, the exhaust hydrogen He is discharged out of the system of the hydrogen-supplying apparatus 3. When the three-way valve 34 is switched to the circulation position, the exhaust hydrogen He is introduced into a hydrogen circulation pump 33.

The controller 4 which makes up the apparatus GS1 for warming-up the fuel cell is composed of CPU, memories, I/O interface, A/D converter, bus, etc., (not shown). The controller 4 totally controls the fuel cell system FCS. The controller 4 also controls the flow amount, temperature and the humidity of the supply air A to be supplied to the fuel cell 1. The controller 4 receives the detected signals from sensors Q, $T_1$, $T_2$, and $T_3$ and H. Also, the controller 4 sends the control signals to the humidifier, to the compressor 24, to the pressure control valve 25, and to the three-way valve 26. The control of (1) the flow amount, (2) temperature and (3) the humidity of the supply air A and (4) control for switching the passage will now be described. As described herein below, the controller 4 possesses two modes, i.e., a starting mode and a normal mode. The tree-way valve 26 is in the returning position at the starting mode, and in the exhaust position at the normal mode.

(1) With regard to the control of the flow amount, the controller 4 sets a target flow amount of the supply air A to be required through a map etc., on the basis of the output demand signal from means for adjusting output such as an accelerator pedal (not shown). When the target flow amount is increased, the controller 4 produces a control signal so as to increase the discharge amount from the compressor 24 (revolution number of the motor) and send it to the compressor 24. On the other hand, when the target flow amount is decreased, the controller 4 produces a control signal so as to decrease the discharge amount from the compressor 24 (revolution number of the motor) and send it to the compressor 24. At this time, a feed back control is performed so that the deviation between the detected signal from the airometer Q and the target flow amount becomes zero.

(2) With regard to the temperature control, the controller 4 the temperature of the supply air A to be the target temperature ranging from 60° C. (the lower limit of the prescribed temperature) to 75° C. (the upper limit of the prescribed temperature) on the basis of the detected signal from the thermo-sensor $T_1$ by means of the opening of the pressure control valve 25 through the stepping motor. Specifically, when the temperature of the supply air A is or will be increased to be not lower than the target temperature, the controller 4 produces a control signal so as to drive the stepping motor in such a manner as to decrease the opening of the pressure control valve, and send the produced signal. This decreases the discharge amount from the compressor 24, decreasing the temperature of the exhaust gas Ae, which in turn, decreases the heat exchange amount in the heat exchanger 22 to thereby decrease the temperature of the supply air A. On the other hand, when the temperature of the supply air A is or will be decreased to be not higher than the target temperature, the controller 4 produces a control signal so as to drive the stepping motor in such a manner as to increase the opening of the pressure control valve, and send the produced signal. This increases the discharge amount from the compressor 24, increasing the temperature of the exhaust gas Ae, which in turn, increases the heat exchange amount in the heat exchanger 22 to thereby increase the temperature of the supply air A. At this time, a feed back control is performed so that the deviation between the detected signal from the thermo-meter $T_1$ and the target temperature becomes zero. Irrelevant to the opening of the pressure control valve 25, the compressor 24 actuates to supply the supply air A in a target flow amount into the fuel cell 1.

As a fail-safe mechanism, when the detected signal from the thermo-sensor $T_2$ becomes higher than a given level (not lower than 150° C.), in order to protect the compressor 24, etc., the controller 4 produces a control signal for increasing the opening of the pressure control valve 25 and/or a control signal for decreasing the discharge amount from the compressor 24 and send it/them. This decreases the temperature at the discharge side of the compressor 24 to thereby protect the compressor 24.

FIG. 3 shows a relationship between the pressure ratio (P1–P5=discharge pressure/intake pressure) of the compressor 24 and the temperature of the exhaust air Ae (the pressure ratio: P5>P4>P3>P2>P1). As seen from this figure, it can be understood that the temperature of the exhaust air Ae can be increased by increasing the pressure ratio of the compressor 24, whereupon the flow amount of the exhaust air Ae only has little influence. Specifically, it can be understood that the temperature of the exhaust air Ae can be controlled by pressure control valve 25. Here, the target temperature described in FIG. 3 is the minimum target temperature of the exhaust air Ae (discharge gas) at the discharge side of the compressor 24. The normal operation (warming-up) is carried out at a temperature higher than the target temperature.

(3) With regard to the humidity control, the controller 4 controls the humidity of the supply air A to be supplied into the inlet of the fuel cell 1 at the cathode pole side so as to be a target humidity on the basis of the detected signal from the humidity sensor H by controlling the opening of the needle valve of the humidifier 23 through a stepping motor. Specifically, when the humidity of the supply air is or will be increased to be higher than the target humidity, the controller 4 produces a control signal such as to drive the stepping motor in such a manner as to decrease the opening of the needle valve and send the produced control signal. This decreases the amount of moisture flowing through the needle valve, decreasing the humidify of the supply air A. On the other hand, when the humidity of the supply air is or will be decreased to be higher than the target humidity, the controller 4 produces a control signal such as to drive the stepping motor in such a manner as to increase the opening of the needle valve and send the produced control signal. This increases the amount of moisture flowing through the needle valve, increasing the humidify of the supply air A. At this time, a feedback control is performed so that the deviation between the detected signal from the humidity sensor H and the target humidity becomes zero.

(4) With regard to the control for switching the passage, when the ignition switch of the vehicle is ON to start the fuel cell system FCS☐ the controller becomes the starting mode. When the controller 4 is in the starting mode, the controller 4 produces a signal so as to switch the three-way valve 26 into the returning position to the three-way valve 26 and send it to the three-way valve 26 (the formation of circulation cycle). As described below, the starting mode is released in such a case that the detected signal from the thermo-sensor $T_3$ exceeds a prescribed level, and the controller 4 is shifted to the normal mode. When being shifted to the normal mode, the controller 4 produces a signal for the three-way valve 26 to be switched into the exhaust position and send the signal to the three-way valve 26. It is possible to configure that when the temperature of the exhaust air Ae discharged from the fuel cell 1 is low, the mode is automatically switched to the starting mode.

Next, one example of the operation of the apparatus GS1 for warming-up the fuel cell according to the first embodiment having being described above will be described by referring to FIG. 4.

Figure 4:
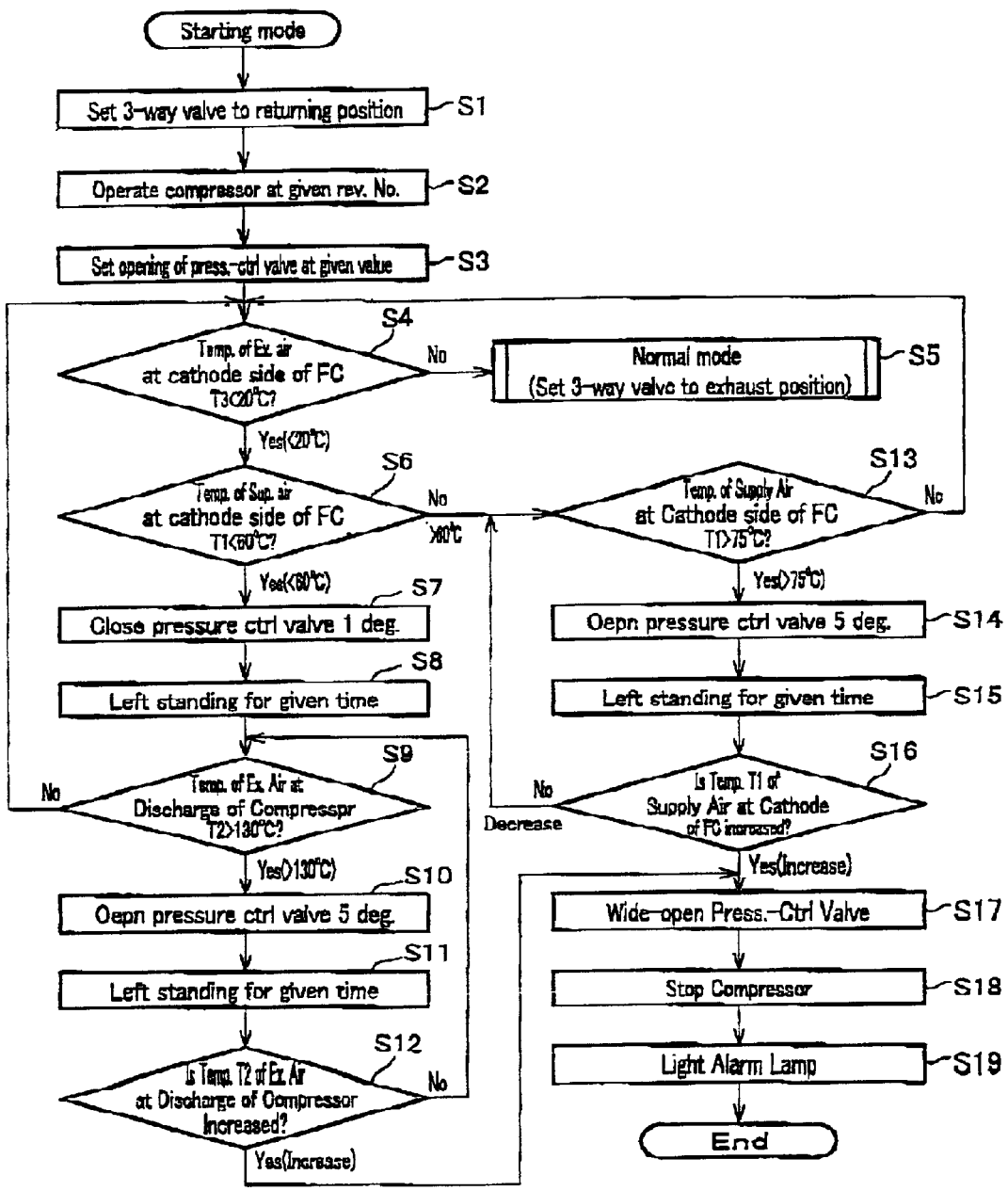
FIG. 4 is a control flow of the apparatus for warming-up the fuel cell according to the first embodiment of the present invention at starting mode.

FIG. 4 is a control flow of the apparatus for warming-up the fuel cell according to the first embodiment of the present invention at starting mode. It is noted that the target temperature of the supply air A at the time of warming-up is from 60° C. (lower limit) to 75° C. (upper limit).

At the starting mode, the controller 4 is switched or positioned to the three-way valve 26 into the returning position to form a circulation cycle (S1). Next, the compressor 24 is operated at a predetermined revolution number (3000 rpm), and the opening of the pressure control valve 25 is set at a prescribed level (S2 and S3). The pressure control valve 25 is set so that the discharge pressure of the compressor 24 is 40 kPaG. This starts the warming-up of the fuel cell 1. In this case, the water is effectively utilized. At this time, the fuel cell does not output electric power. Since the pressure at point C in FIG. 1 is lower than that at point b in FIG. 1, the supply air A from point C does not flow to point A, but the exhaust air Ae from point B flows (pressure of point b>pressure of point c>pressure of point A).

Next, the controller judges whether or not the temperature of the exhaust air Ae at the outlet of the fuel cell 1 of the cathode side is lower than 20° C. (S4). If it is not lower than 20° C., since the warming-up can be judged to be completed, the controller 4 executes the normal mode (S5). At the time of the execution of the normal mode, the fuel cell 1 starts the power generation, and the three-way valve 26 of the air-supplying apparatus 2 is positioned to the exhaust position. When the power generation is started, oxygen and hydrogen are consumed.

On the other hand, if the temperature of the exhaust air Ae is lower than 20° C. in Step 4, the warming-up is continued. In this case, the controller 4 judges whether or not the temperature of the supply air A at the cathode side of the fuel cell 1 is lower than 60° C. (S6). If it is lower than 60° C., the pressure control valve 2 is closed 1 degree (S7), and this state is kept for a given period of time (several seconds) (S8). This increases the temperature of the exhaust air Ae (discharge gas) and that of the supply air A, rapidly warming-up the fuel cell. In step S9, the controller 4 judges whether or not the temperature of the exhaust air Ae at the discharge side of the compressor 24 exceeds 130° C. If it is not higher than 130° C., which is the temperature having no problem, the controller 4 is returned to step S4 to continue the warming-up. If the temperature of the exhaust air Ae at the discharge side of the compressor 24 exceeds 130° C., the pressure control valve 25 is opened 5 degree, and this state is kept for a given period of time (several seconds) (S10 and S11). This decreases the temperature of the exhaust gas Ae at the discharge side of the compressor 24. Preferably, the actual temperature is judged in step S12; if the temperature is decreased, the controller 4 is returned to step 4 to continue the treatment (it is also possible to be returned to step S4).

If the temperature of the exhaust gas Ae at the discharge side of the compressor 24 is still increased (or is not lower than 150° C. (prescribed temperature)), the controller 4 is shifted to step S17 to execute a fail-safe action to wide-open the pressure control valve and to stop the compressor 24 (S17 and S18). In this case, an alarm lamp is turned on to notify the abnormality to the driver, because of the consideration of the abnormality of the pressure control valve 25.

If the temperature of the supply air A at the cathode side of the fuel cell 1 is not lower than 60° C. in Step S6, the controller judges whether or not the temperature of the supply air A at the cathode side of the fuel cell 1 exceeds 75° C., which is the upper limit of the target temperature (S13). If it is lower than 75° C., which is an appropriate temperature, the controller is returned to step S4 to continue the treatment.

On the other hand, if the temperature of the supply air A at the cathode side of the fuel cell 1 exceeds 75° C., the pressure control valve 25 is opened 5 degree, and this state is kept for a prescribed period of time (several seconds) (S14 and S15). This decreases the temperature of the exhaust air Ae at the discharge side of the compressor 24 and the temperature of the supply air A at the cathode side of the fuel cell 1. Preferably, the actual temperature is judged in step S12; if the temperature is decreased, the controller 4 is returned to step 4 to continue the treatment (it is also possible to be returned to step S4). If the temperature of the exhaust gas Ae at the discharge side of the compressor 24 is still increased (or is not lower than 150° C. (prescribed temperature)), in which case the mechanical abnormality can be considered as described above, the fail-safe action is executed to wide-open the pressure control valve and to stop the compressor 24 (S17 and S18). In this case, an alarm lamp is turned on to notify the abnormality to the driver. When the pressure control valve 25 is wide-opened, the temperature of the exhaust air Ae is decreased even in the case where the compressor does not stopped.

As described above, by switching the three-way valve 26 from the starting mode to the normal mode or vice versa and by returning the exhaust air Ae to the fuel cell 1 as the supply air A again, the heat generated by the adiabatic compression of the compressor can be used without wasting it to thereby warms-up the fuel cell. Also, the moisture stored in the interior of the fuel cell 1 can be effectively utilized. While means for spraying water is utilized as the humidifier 23 described in this embodiment, it is also possible to employ means for utilizing a water-permeable hollow fiber membrane. Also, although the description is omitted, the hydrogen-supplying apparatus may be configured to carry out the temperature control and humidity control.

[Second Embodiment]

Next, an apparatus for warming-up the fuel cell according to the second embodiment of the present invention will now be described. Elements, parts, and the like identified with those of the first embodiment have the same numerals or symbols and their descriptions will be omitted.

Figure 5:
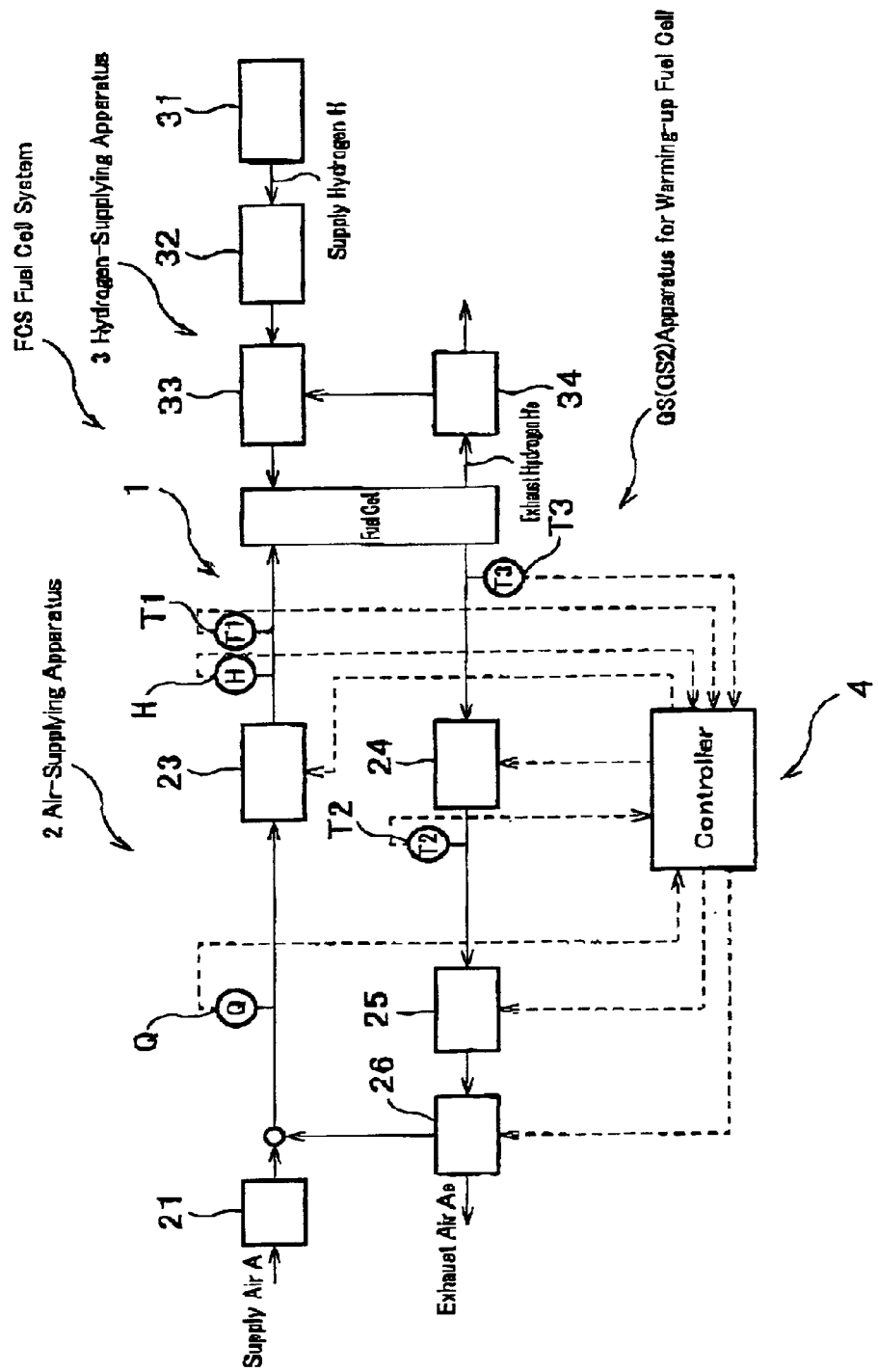
FIG. 5 totally shows a fuel cell system including an apparatus for warming-up a fuel cell according to the second embodiment of the present invention.

FIG. 5 totally shows a fuel cell system including an apparatus for warming-up a fuel cell according to the second embodiment of the present invention.

As shown in FIG. 5, the apparatus GS2 for warming-up a fuel cell according to the second embodiment is configured that no heat exchanger is provided (other portions are the same as those of the first embodiment). In this configuration, the heat generated by the adiabatic compression of the compressor can be used without wasting it to thereby warms-up the fuel cell, and the moisture stored in the interior of the fuel cell 1 can be effectively utilized similar to the first embodiment. A heat exchanger may be provided downstream the three-way valve 26 (discharge side) to carry out heat exchange between the exhaust air Ae and the supply air A at the normal mode.

[Third Embodiment]

Next, an apparatus for warming-up the fuel cell according to the third embodiment of the present invention will now be described. Elements, parts, and the like identified with those of the first embodiment have the same numerals or symbols and their descriptions will be omitted.

Figure 6:
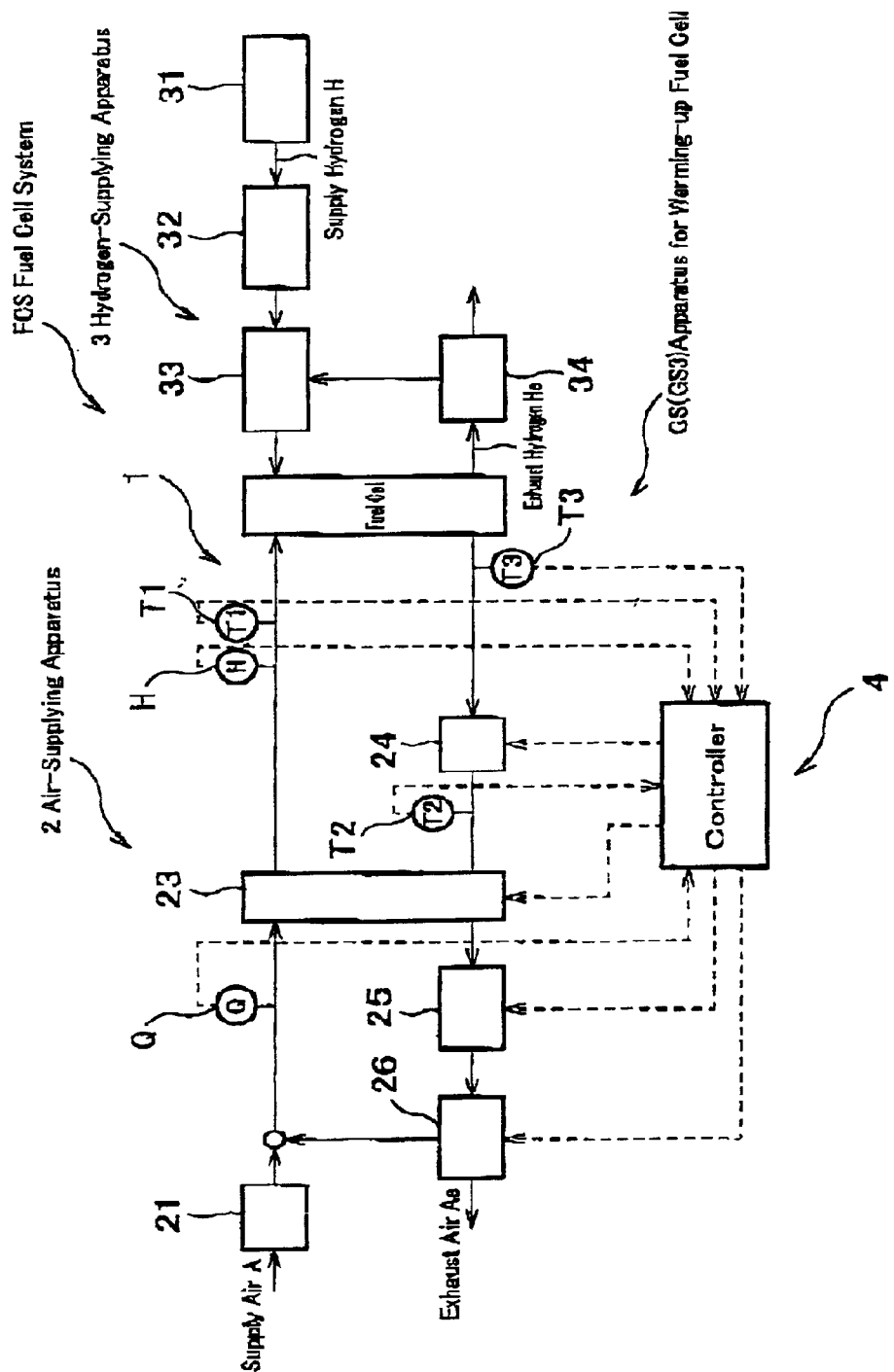
FIG. 6 totally shows a fuel cell system including an apparatus for warming-up a fuel cell according to the third embodiment of the present invention.

FIG. 6 totally shows a fuel cell system including an apparatus for warming-up a fuel cell according to the third embodiment of the present invention.

In an apparatus GS3 for warming-up the fuel cell according to the third embodiment, a water-permeable type humidifier utilizing hollow fiber membrane (not shown) is used as the humidifier 23. The hollow fiber membrane comprises hollow fibers each having a hollow passage, a diameter ranging from 1 to 2 mm and a length of several ten cm. The humidifier 23 is composed of two hollow fiber membrane modules each accommodated within a hollow container, each module comprising a bundle of several thousands of hollow fibers, piping which connects these two hollow fiber membrane modules in parallel, switchers (switching means) for switching these two hollow fiber membrane modules depending upon the flow amount and the humidity of the supply air, such as an electromagnetic valve and a controller for the electromagnetic valve (all being not shown). In this embodiment, the controller for the electromagnetic valve is included in the controller 4.

A packing ratio of the hollow fiber membrane in each hollow fiber membrane module is from 40 to 60% relative to the cross-section of the hollow container. The hollow fiber membrane module is configured so that the exhaust air Ae flows from one end of the hollow passage and is discharged from another end. Also, the hollow fiber membrane module is configured so that the supply air A flows through the gaps among the hollow fibers and is then discharged. Specifically, the hollow fiber membrane module is configured not so as to mix the supply air A with the exhaust air Ae. On the other hand, the hollow fiber membrane module possesses a plurality of capillary tubes from its internal surface to the external surface each having a diameter of several nm. In the capillary tubes, the vapor pressure is decreased, easily resulting in condensation of the moisture. The condensed moisture is sucked out due to the capillary phenomenon and is permeated through the hollow fiber membrane. Consequently, when the exhaust air Ae containing a large amount of moisture produced in the fuel cell 1 flows through the hollow passage, the moisture is condensed on the internal surface of the hollow passage, and the condensed moisture humidifies the supply air A which is relatively dried and flows through the gaps among the hollow fibers. It is also possible that the supply air A flows through the hollow passage side and the exhaust air Ae flows through the gaps among the hollow fibers.

The humidifier 23 is configured so that when the flow amount of the supply air is small, the switcher switches the hollow fiber membrane modules so as to only use one hollow fiber membrane module, and when the flow amount of the supply air is large, the switcher switches the hollow fiber membrane modules so as to use both hollow fiber membrane modules. The switching of the hollow fiber membrane module is due to the humidification characteristic of the hollow fiber membrane module that the humidification performance of the hollow fiber membrane module is decreased if the follow amount of the supply air A and that of the exhaust air Ae are too small or too large. The timing for switching the hollow fiber membrane modules or such is decided by the detected signal from the airmometer Q and the detected signal from the humidity sensor H.

The humidifier 23 utilizing the hollow fiber membrane modules also serves as a heat exchanger which exchanges the heat possessed by the supply air A and that possessed by the exhaust air Ae. Consequently, unlike the first embodiment, the apparatus for warming-up the fuel cell according to this embodiment has no separate heat exchanger.

The apparatus GS3 for warming-up the fuel cell according to the third embodiment having the same configurations as those of the first embodiment, except for the portion of the heat exchanger and the humidifier can rapidly warm-up the fuel cell only in a simple configuration where three-way valve 26 is switched. In the apparatus GS3 for warming-up the fuel cell according to the third embodiment, the moisture stored in the interior of the fuel cell 1 can be effectively utilized and, thus, no or little water for storing water for humidification is required to be stored. Also, the humidification of the supply air A can be carried out in a uniform manner.

[Fourth Embodiment]

Next, an apparatus for warming-up the fuel cell according to the fourth embodiment of the present invention will now be described. Elements, parts, and the like identified with those of the first embodiment have the same numerals or symbols and their descriptions will be omitted.

Figure 7:
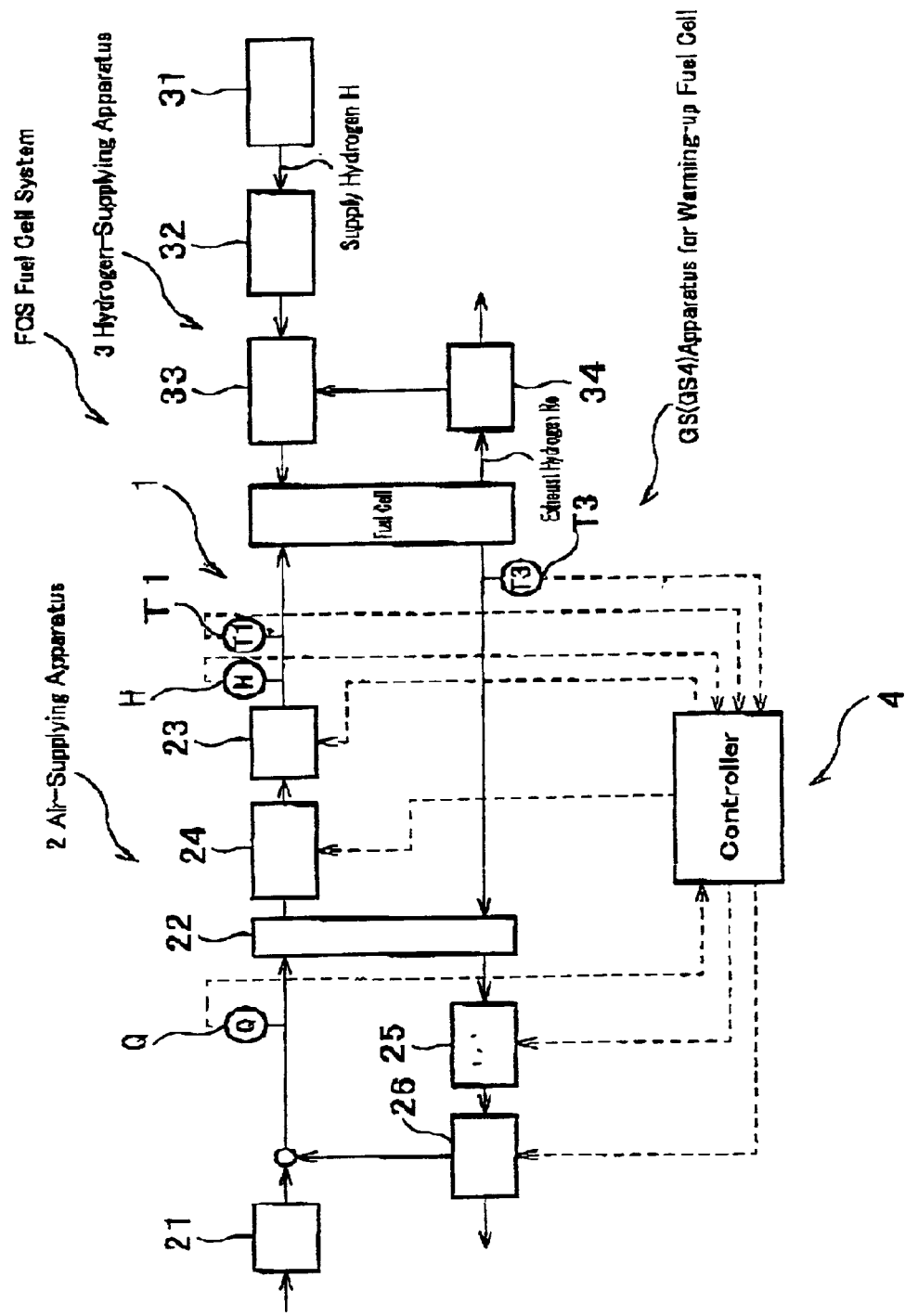
FIG. 7 totally shows a fuel cell system including an apparatus for warming-up a fuel cell according to the fourth embodiment of the present invention.

FIG. 7 totally shows a fuel cell system including an apparatus for warming-up a fuel cell according to the fourth embodiment of the present invention.

In the apparatus GS4 for warming-up the fuel cell according to the fourth embodiment, the compressor 24 is provided between an outlet of the supply air A in the heat exchanger 24 and the humidifier 23. In this configuration, the supply air A introduced via the air cleaner 21 is supplied into the fuel cell 1 via the compressor 24. While the supply air A is adiabatically compressed in the compressor 24 to be pressed into the fuel cell 1, the supply air A is heated during the course of the adiabatic compression to be heated supply air AH. Consequently, the heated supply air AH is supplied into the fuel cell 1, which is contributed to the warming-up of the fuel cell 1.

Similar to the first embodiment, since the tree-way valve 26 is positioned to the returning position at starting the fuel cell 1, the heated supply air AH, which has been supplied into the fuel cell 1 for the purpose of warming-up the fuel cell 1, is discharged from the fuel cell 1 to be heated exhaust air AeH, which is then pressed into the supply side of the compressor 24. Although the heat is taken when the fuel cell 1 is warmed-up, the heated exhaust air AeH supplied into the fuel cell 1 has a calorie higher than that possessed by the atmosphere. By returning the heated exhaust air AeH having a calorie higher than that possessed by the atmosphere, the fuel cell 1 can be warmed-up in a much more rapid manner.

After the completion of warming-up the fuel cell 1, the three-way valve 26 is switched into the exhaust position and the normal operation is carried out.

Figure 8:
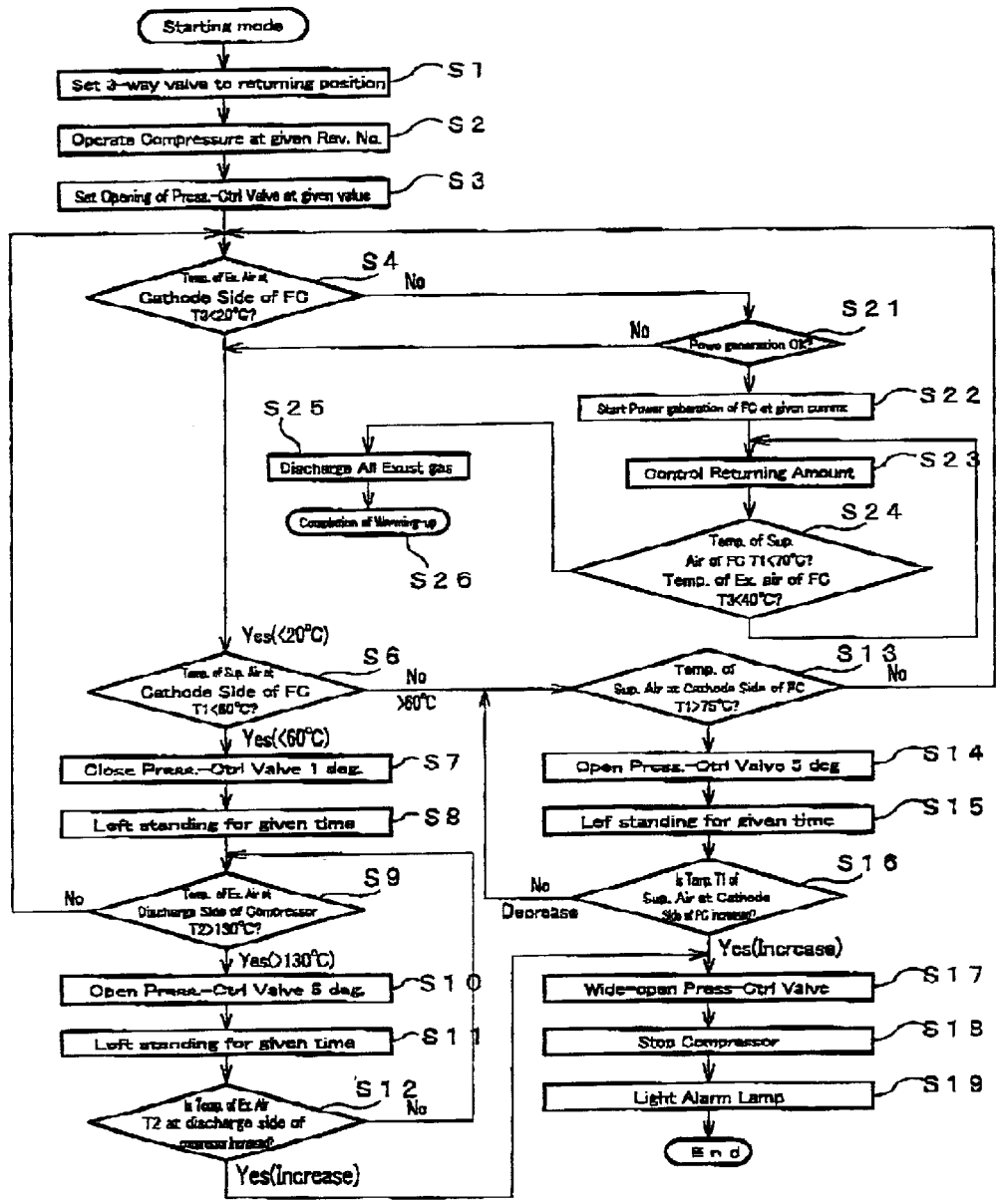
FIG. 8 is a control flow of the apparatus for warming-up the fuel cell according to the fourth embodiment of the present invention at starting mode.

Next, one example of the operation of the apparatus GS4 for warming-up the fuel cell according to the fourth embodiment having being described above will be described by referring to FIG. 8 (also see FIG. 7, as occasion demands). Since this operation has the same portions as those in the case of the starting mode in the first embodiment, the detailed description thereof will be omitted.

At the starting mode, the three-way valve is positioned into the returning position (S1), and the compressor is operated at a given revolution number (S2). Subsequently, the opening of the pressure valve 25 is set at a prescribed level (S3), and the controller judges whether or not the temperature $T_3$ of the exhaust air at the cathode side of the fuel cell 1 (heated exhaust air AeH) is lower than 20° C. (S1). These steps are the same as those of the starting mode of the first embodiment. Since the fuel cell has not yet generated electric power, power for driving the compressor 24 should be required. This power can be taken, for example, from a capacitor or a battery (not shown). If the temperature of the heated exhaust air AeH is judged to be lower than 20° C., the controller 4 executes steps from step 6 to step 19, as in the first embodiment.

On the other hand, if the temperature of the heated exhaust air AeH is judged to be not lower than 20° C., the controller 4 is shifted to the normal mode and judges whether or not the fuel cell 1 is ready for power generation (S21). If the fuel cell 1 is judged to be not ready for power generation, the controller 4 is returned to step 6, and then repeats the steps from S6 to S19 as in the first embodiment. If the fuel cell 1 is judged to be ready for power generation, the fuel cell 1 starts power generation at a prescribed current (S22). The power generation at this time is carried out only at a low current because the fuel cell 1 has not yet been warmed-up. Specifically, the power generation at this time is regarded to be previous power generation, and is not regarded to be the normal power generation.

When the previous power generation at a low current is started, the fuel cell is heated by itself due to the heat generated by the power generation, which also helps the warming-up of the fuel cell. The amount of returning the heated exhaust air AeH is controlled not so as to supply an excess amount of the heated exhaust air AeH into the compressor 24 to decrease the amount of oxygen of the heated supply air AH supplied into the fuel cell 1 (S23). At this time, according to decrease in the amount of returning the heated exhaust air AeH, or according to oxygen decrease in the circulation cycle, the fresh air is taken to replenish oxygen. In the former case, the tree-way valve serving as the means for returning the exhaust gas is controlled to discharge a part of the heated exhaust gas. In the later case, a part of the heated exhaust gas is discharged out of the circulation cycle.

Subsequently, the temperature $T_1$ of the heated supply air AH to be supplied to the fuel cell and the temperature $T_2$ of the heated exhaust air AeH discharged from the fuel cell 1 are detected. Two conditions, i.e., whether or not the temperature $T_1$ of the heated supply air AH is less than 70° C., and whether or not the temperature $T_2$ of the heated exhaust air AeH is less than 40° C., are judged (S24). If both conditions are not satisfied, the controller 4 judges that the warming-up has not yet been completed to return step 23. If any one of both conditions is satisfied, the three-way valve 26 is positioned to the exhaust position to discharge all of the heated exhaust gas (S25). Then, the warming-up is completed (S26) and, thereafter, the power generation of the fuel cell 1 is started.

If the temperature $T_3$ f the heated exhaust air AeH from the fuel cell 1 is less than 20° C. at the starting mode, the starting mode is maintained to exhibit the effect similar to the first embodiment. When the temperature $T_3$ f the heated exhaust air AeH from the fuel cell 1 becomes 20° C. to be shifted to the normal mode, formal power generation is not carried out until the warming-up of the fuel cell is completed and previous power generation is only carried out. Since the formal power generation is started after the completion of the warming-up, the warming-up of the fuel cell 1 can be effectively carried out, and the power generation of the fuel cell 1 can be carried out in a suitable manner.

In this example, the heat exchanger is provided in order to carry out heat exchange between the heated exhaust air AeH and the heated supply air AH. This decreases the returning amount corresponding to the amount of oxygen which is decreased according to the power generation of the fuel cell and, thus, only the calorie possessed by the exhaust gas can be transmitted. Accordingly, the configuration difficult to discharge the heat can be made up.

[Fifth Embodiment]

Next, an apparatus for warming-up the fuel cell according to the fifth embodiment of the present invention will now be described. Elements, parts, and the like identified with those of the first to fourth embodiments have the same numerals or symbols and their descriptions will be omitted.

Figure 9:
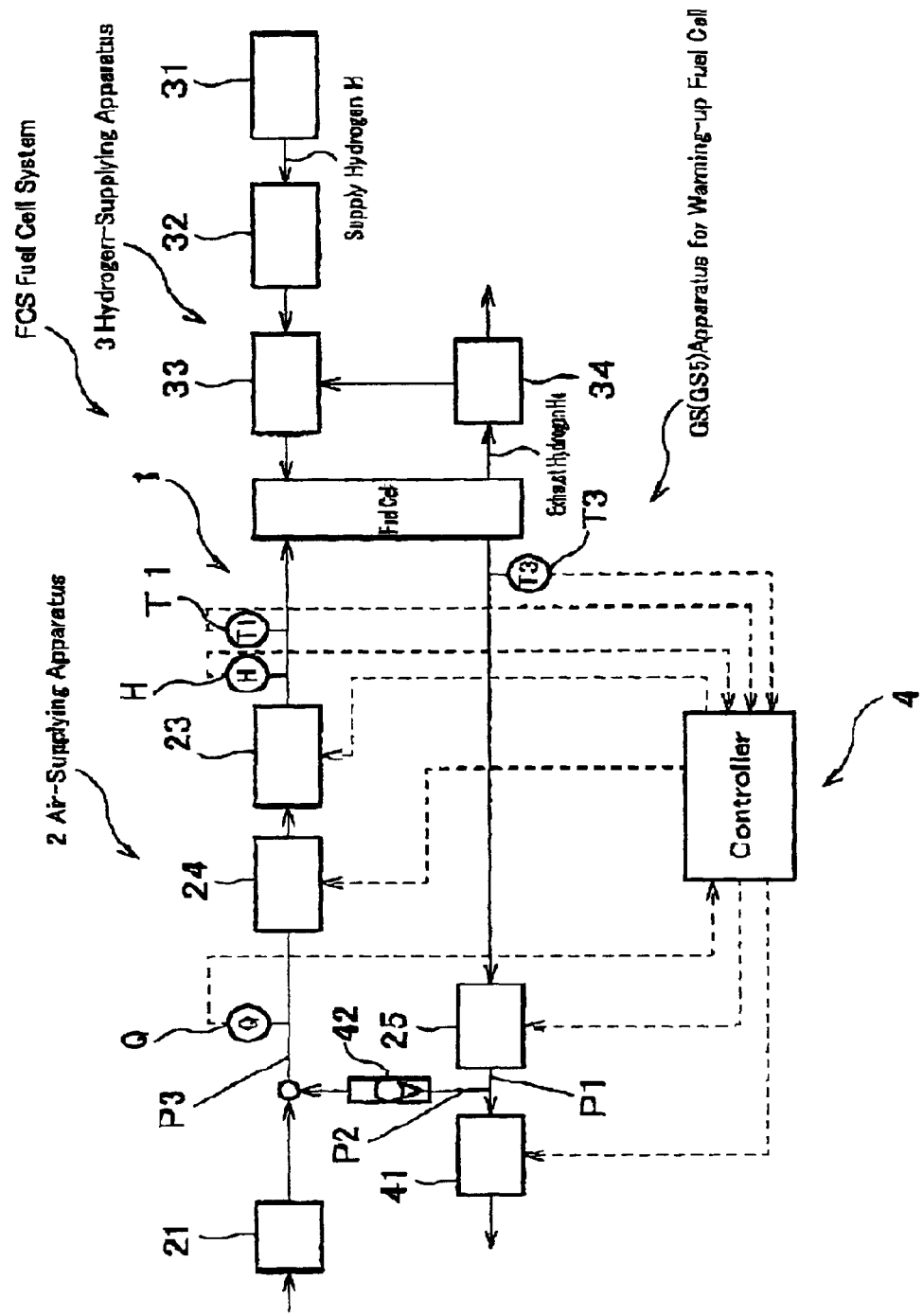
FIG. 9 totally shows a fuel cell system including an apparatus for warming-up a fuel cell according to the fifth embodiment of the present invention.

FIG. 9 totally shows a fuel cell system including an apparatus for warming-up a fuel cell according to the fifth embodiment of the present invention.

As shown in FIG. 9, the apparatus GS5 for warming-up the fuel cell according to the fifth embodiment has no heat exchanger 22 and a flow amount control valve 41 instead of the three-way valve 26 in comparison with the apparatus according to the fourth embodiment. A branch pipe P2 is provided on the pipe P1 between the pressure control valve 25 and the flow amount control valve 41, and connected to a pipe 3 between the airometer Q and the compressor 24. A check valve 42 is provided on the pipe p3.

In this configuration, when the fuel cell 1 is warmed-up, the check valve 42 can be opened to return the heated exhaust air AeH containing a large amount of heat discharged from the fuel cell 1 to the compressor 24. When the check valve 42 is left opening after starting the initiation of the power generation of the fuel cell 1, the heated exhaust air AeH is introduced into the compressor 24. For this reason, at the time which the fuel cell 1 dose not start the power generation at the time of starting the fuel cell 1 as well as at the time after the fuel cell 1 starts power generation, this can be contributed to rapid warming-up of the fuel cell 1. Since the flow amount of the heated exhaust air AeH can be controlled by means of the flow amount control valve 41, the temperature $T_1$ of the heated supply air Ah at the inlet of the fuel cell 1 can be restricted not to exceed the upper limit. Consequently, the fuel cell 1 can be rapidly warmed-up at a temperature within the range not exceeding the upper limit of the temperature $T_1$ of the heated supply air Ah at the inlet of the fuel cell 1.

[Sixth Embodiment]

Next, an apparatus for warming-up the fuel cell according to the sixth embodiment of the present invention will now be described. Elements, parts, and the like identified with those of the first to fifth embodiments have the same numerals or symbols and their descriptions will be omitted.

Figure 10:
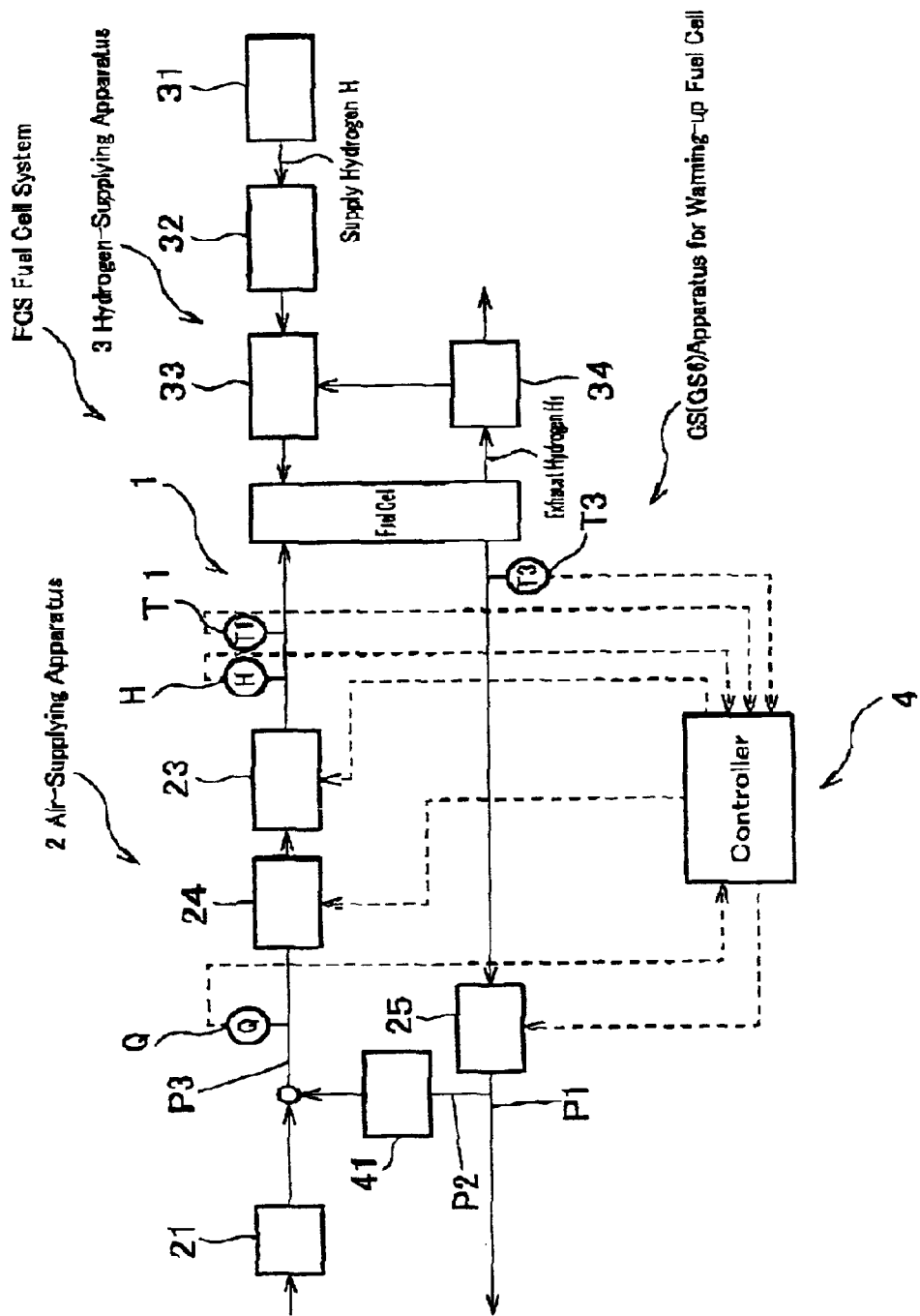
FIG. 10 totally shows a fuel cell system including an apparatus for warming-up a fuel cell according to the sixth embodiment of the present invention.

FIG. 10 totally shows a fuel cell system including an apparatus for warming-up a fuel cell according to the sixth embodiment of the present invention.

The apparatus GS6 for warming-up the fuel cell according to the sixth embodiment has the flow amount control valve 41 provided on the branched pipe P2 and no device provided on the pipe P1 in comparison with the apparatus according to the fifth embodiment.

In this configuration, the amount of the heated exhaust air AeH to be returned to the compressor 24 can be controlled by the flow amount control valve 41 provided on the branched pipe 24. Consequently, as in the fifth embodiment, at the time which the fuel cell 1 dose not start the power generation at the time of starting the fuel cell 1 as well as at the time after the fuel cell 1 starts power generation, this can be contributed to rapid warming-up of the fuel cell 1. Since the flow amount of the heated exhaust air AeH can be controlled by means of the flow amount control valve 41, the temperature $T_1$ of the heated supply air Ah at the inlet of the fuel cell 1 can be restricted not to exceed the upper limit. Consequently, the fuel cell 1 can be rapidly warmed-up at a temperature within the range not exceeding the upper limit of the temperature $T_1$ of the heated supply air Ah at the inlet of the fuel cell 1.

While embodiments of the present invention have been described, various modifications of the present invention can be made.

For example, while the hydrogen-supplying apparatus in these embodiments has a configuration that hydrogen is supplied from the hydrogen gas cylinder into the fuel cell, a liquid raw fuel material may be reformed in a reformer, which is supplied into the fuel cell. Regardless of the circulation of the exhaust hydrogen, the present invention may be applied at the side of the hydrogen gas-supplying apparatus. The humidifier in the first and second embodiment may be one which utilize a two fluid nozzle or supersonic waves. The water-permeable membrane in the third embodiment is also not restricted to the hollow fiber membrane. With regard to the compressor, in addition to a super turbo charger type or a turbo charger type, which revolves a turbine, a reciprocating type may also be utilized.

The fuel cell never consumes hydrogen and oxygen, if it generates power (i.e., if electrons generated in the anode are not moved to the cathode). If the fuel cell generates power the starting mode, the fuel cell generates heat, which can be possibly contributed to the warming-up of the fuel cell (it is noted that in the situation where the warming-up is not sufficiently carried out, the power generation efficiency is small and the heat is generated only in a small amount). Also, the completion of the starting mode is judge by a time by providing a timer instead of the detection of the temperature.

What is claimed is:

1. An apparatus for warming-up a fuel cell, wherein a supply gas is supplied into the fuel cell and discharged as an exhaust gas after being utilized by the fuel cell, the apparatus comprising:

means for returning an exhaust gas to the supply gas depending upon a warm-up condition at a time of starting up the fuel cell, and when the temperature of the fuel cell is lower than a prescribed level; and a heat exchanger which conducts heat-exchange between the supply gas and the exhaust gas.

2. The apparatus for warming-up a fuel cell as claimed in claim 1, further comprising:

a controller for controlling said means for returning the exhaust gas when the temperature of the fuel gas is lower than a prescribed temperature.

3. The apparatus for warming-up a fuel cell as claimed in claim 1, wherein said supply gas is air which is supplied to an oxygen pole side of the fuel cell, and further comprising a controller for controlling said means far returning the exhaust gas depending upon the amount of oxygen in the air supplied into the oxygen pole of the fuel cell.

4. The apparatus for warming-up a fuel cell as claimed in claim 3, wherein the means for returning the exhaust gas decreases the amount of exhaust gas to be returned when the amount of oxygen is decreased due to the power generation of the fuel cell.

5. An apparatus for warming-up a fuel cell which supplies a supply gas into the fuel cell and which discharges the supply gas as an exhaust gas after being utilized in fuel cell, said apparatus comprising:

a compressor for compressing the exhaust gas to generate heat by adiabatic compression and supplying the exhaust gas to the supply gas, wherein the supply gas is heated by the exhaust gas, the heated supply gas is supplied into the fuel cell to warm the fuel cell, and all of the exhaust gas discharged from the fuel cell is returned to the compressor to form a circulation cycle during a warming-up period at a time of starting up the fuel cell and when the temperature of the fuel cell is lower than a prescribed level, wherein said circulation cycle includes a heat exchanger which conducts heat-exchange between the supply gas drawn by the compressor in a negative pressure and the exhaust gas adiabatically heated by said compressor.

6. The apparatus for warming-up a fuel cell as claimed in claim 5, further comprising a controller for determining whether or not the warming-up of the fuel cell has been completed, wherein the power generation of said fuel cell is started after the warming-up is determined to be completed.

7. The apparatus for warming-up a fuel cell as claimed in claim 6, wherein the controller determines completion of the warming-up based on the temperature of the exhaust gas discharged from the fuel cell.

8. The apparatus for warming-up a fuel cell as claimed in claim 5, wherein said supply gas is which is supplied to an oxygen pole side of the fuel cell, when the amount of oxygen in said circulation cycle is decreased due to the power generation of the fuel cell, the fresh air is taken to replenish oxygen.

9. The apparatus of claim 1, further comprising a humidifier for humidifying the supply gas.

10. The apparatus of claim 1, wherein the means for returning an exhaust gas stops returning the exhaust gas to the supply gas when the temperature of exceeds the predetermined level.

11. The apparatus of claim 1, wherein the means for returning an exhaust gas returns all of the exhaust gas to the supply gas when the temperature of the fuel cell is below a predetermined level.

12. A method for warming-up a fuel cell, comprising the steps of:

supplying a supply gas to a cathode of a fuel cell, wherein the fuel cell reacts the supply gas to produce an exhaust gas;

compressing the exhaust gas to increase the temperature of the exhaust gas, measuring the temperature of the compressed exhaust gas, returning the exhaust gas to the supply gas when the temperature of the exhaust gas is lower than a predetermined level; and increasing an opening in a pressure control valve if the temperature of the compressed exhaust gas exceeds a predetermined level.

13. The method of claim 12, further comprising the step of:

generating an alarm if compressed exhaust gas continues to exceed predetermined level after a predetermined time period.

14. An apparatus for warming-up a fuel cell, wherein a supply gas is supplied into the fuel cell and discharged as an exhaust gas after being utilized by the fuel cell, the apparatus comprising:

means for measuring the temperature of the exhaust gas;

a compressor, which discharges the exhaust gas from the fuel cell and which returns the exhaust gas to the supply gas, wherein said compressor returns the exhaust gas to the supply gas when the temperature of the exhaust gas detected by said means for measuring the temperature of the exhaust gas is lower than a predetermined level, and wherein said compressor compresses the exhaust gas to increase the temperature of the exhaust gas;

means for measuring the temperature of the compressed exhaust gas; and a pressure control valve which controls the pressure of the exhaust gas having being compressed by the compressor, wherein an opening in said pressure control valve is increased if the temperature of the compressed exhaust gas exceeds predetermined level.

15. An apparatus for warming-up a fuel cell which supplies a supply gas into the fuel cell by a negative pressure suction by a compressor provided on a downstream of the fuel cell, and which discharges the supply gas in an exhaust gas after being utilized in the fuel cell, as an exhaust gas, having being compressed by said compressor, comprising means for returning an exhaust gas, which has been heated by adiabatic compression through said compressor, wherein said means for returning an exhaust gas returns the exhaust gas at the time of starting up the fuel cell and also the temperature of the fuel cell is lower than a predetermined level, and a heat exchanger which conducts exchange between the supply gas drawn by the compressor in a negative pressure and the exhaust gas adiabatically heated by said compressor.

16. The apparatus as claimed in claim 15, further comprising a valve, which enhance the temperature of the exhaust gas when it is actuated towards the closing direction, provided downstream of the heat exchanger, to enhance the temperature of the exhaust gas introduced into the heat exchanger.

17. The apparatus as claimed in claim 15, wherein the means for returning an exhaust gas returns all of the exhaust gas to the supply gas when the temperature of the fuel cell is below a predetermined level.

* * * * *